H. C. PARKINSON.
COLD KNOB FOR POT COVERS.
APPLICATION FILED AUG. 26, 1907.

899,260.

Patented Sept. 22, 1908.

WITNESSES

INVENTOR
H. C. Parkinson
BY
Medina & Griffin
ATTORNEYS

UNITED STATES PATENT OFFICE.

HARVEY C. PARKINSON, OF BERKELEY, CALIFORNIA.

COLD KNOB FOR POT-COVERS.

No. 899,260.  Specification of Letters Patent.  Patented Sept. 22, 1908.

Application filed August 26, 1907. Serial No. 390,144.

*To all whom it may concern:*

Be it known that I, HARVEY C. PARKINSON, a citizen of the United States, residing at Berkeley, in the county of Alameda and State of California, have invented a new and useful Cold Knob for Pot-Covers, of which the following is a specification in such full and clear terms as will enable those skilled in the art to construct and use the same.

This invention relates to knobs used for the purpose of lifting covers from pots and pans, and its object is to produce a knob such as will allow the cover to be lifted from the vessel without danger of burning the fingers. It is common in the new wares being put on the market at the present time to supply a knob with the covers of such cooking utensils, but this knob is what is termed a "spun knob". This spun knob is made by forming the metal of the cover itself up into a knob, a hollow being formed on the inside of the knob. This is a very good knob for the reason that it does not present a broken surface to the steam and it does not rust out as quickly as the knobs secured with a rivet, but it has the disadvantage of becoming so hot from the steam that collects in the inside of it that a person will burn the fingers every time the cover is taken off the pot, unless a cloth is used for protection.

It is the object of this invention to provide a knob for such covers that will be at once inexpensive and will prevent the person using the same from burning the fingers when lifting a cover from a pot.

Figure 1:
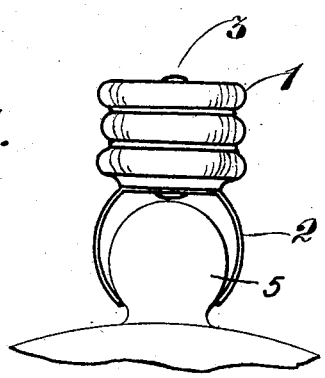
Figure 2:
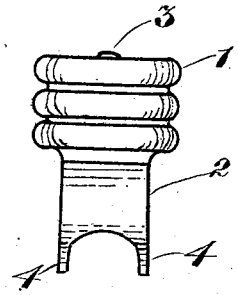

In the drawings, in which the same numerals represent the same parts throughout, Figure 1 is a side elevation of the knob, and Fig. 2 is another side elevation of the device the plane of view being taken at right angles with that of Fig. 1.

The knob proper 1 is made of wood or any other non-conducting material that may be suitable and has secured to its under side the spring 2, said spring being secured to the knob by means of the rivet 3. The spring has two arms which reach down on each side of the cover knob 5 and the two prongs 4, 4 embrace the reduced portion or neck of said knob and hold it securely. The spring may be made of any good spring steel which will allow it to be used on knobs of any size, the spring holding the cold knob firmly to the cover and since it is made of a non-conductor it will not burn the fingers when the cover is lifted off the pot.

What I claim as new and desire to secure by Letters Patent of the United States is as follows, modifications within the scope of the claims being expressly reserved.

1. A lifting device for pot covers, comprising a handle and normally open flat spring jaws depending therefrom, said jaws having means integral therewith for engaging and removably holding the reduced portion or neck of the knob of a pot cover.

2. In a cold knob for pot covers, a non-conducting knob, a flat spring secured to the base thereof, and having a pair of oppositely curved arms depending therefrom, said arms having means integral therewith for engaging and removably holding the reduced portion or neck of a pot cover knob.

3. In a cold knob for pot covers, the combination of a knob of non-conducting material, a flat spring secured thereto and comprising a pair of arms depending therefrom, and a notch cut respectively in the end of each arm to embrace a pot cover knob.

In testimony whereof I have set my hand this 17th day of August A. D. 1907, in the presence of two subscribed witnesses.

HARVEY C. PARKINSON.

Witnesses:
  E. O. SMITH,
  DAVID CRAIG.